United States Patent
Jung et al.

(10) Patent No.: US 11,543,517 B2
(45) Date of Patent: Jan. 3, 2023

(54) METHOD AND APPARATUS FOR PHASE UNWRAPPING OF SYNTHETIC APERTURE RADAR (SAR) INTERFEROGRAM BASED ON SAR OFFSET TRACKING SURFACE DISPLACEMENT MODEL

(71) Applicant: UNIVERSITY OF SEOUL INDUSTRY COOPERATION FOUNDATION, Seoul (KR)

(72) Inventors: Hyung-Sup Jung, Seoul (KR); Won-Kyung Baek, Seoul (KR); Sung-Ho Chae, Seoul (KR)

(73) Assignee: University of Seoul Industry Cooperation Foundation, Seoul (KR)

(*) Notice: Subject to any disclaimer, the term of this patent is extended or adjusted under 35 U.S.C. 154(b) by 43 days.

(21) Appl. No.: 16/627,127

(22) PCT Filed: Aug. 12, 2019

(86) PCT No.: PCT/KR2019/010193
§ 371 (c)(1),
(2) Date: Dec. 27, 2019

(87) PCT Pub. No.: WO2021/020636
PCT Pub. Date: Feb. 4, 2021

(65) Prior Publication Data
US 2021/0033726 A1 Feb. 4, 2021

(30) Foreign Application Priority Data
Aug. 1, 2019 (KR) .................. 10-2019-0094054

(51) Int. Cl.
G01S 13/90 (2006.01)
G01S 13/72 (2006.01)
H01Q 3/26 (2006.01)

(52) U.S. Cl.
CPC .......... *G01S 13/9023* (2013.01); *G01S 13/72* (2013.01); *G01S 13/904* (2019.05); *H01Q 3/26* (2013.01)

(58) Field of Classification Search
CPC .... G01S 13/9023; G01S 13/904; G01S 13/72; H01Q 3/26
See application file for complete search history.

(56) References Cited

U.S. PATENT DOCUMENTS 7,450,054 B2 * 11/2008 Sartor ..................... G06T 5/50
342/194
7,692,571 B2 * 4/2010 Lovberg ............... H01Q 25/008
701/16

(Continued)

FOREIGN PATENT DOCUMENTS

JP 2004309178 A 11/2004
JP 2004309178 A * 11/2004

(Continued)

OTHER PUBLICATIONS

Won-Kyung Baek et al., Feasibility of ALOS2 PALSAR2 Offset-Based Phase Unwrapping of SAR Interferogram in Large and Complex Surface Deformations, date of publication Aug. 16, 2018.

*Primary Examiner* — Bernarr E Gregory
*Assistant Examiner* — Nuzhat Pervin
(74) *Attorney, Agent, or Firm* — Rabin & Berdo, P.C.

(57) ABSTRACT

The present disclosure relates to a method and apparatus for phase unwrapping of an SAR interferogram based on an SAR offset tracking surface displacement model, in which the apparatus according to the present disclosure includes a Synthetic Aperture Radar (SAR) image acquisition unit that acquires two SAR images of a same object acquired at different times, a single look complex (SLC) image production unit that produces two SLC images corresponding to each of the two SAR images, an interferogram production (Continued)

unit that generates an SAR interferogram using SAR interferometry for the two SLC images, a surface displacement model production unit that produces an offset tracking surface displacement model using SAR offset tracking method for the two SLC images, an unwrapped residual interferogram generation unit that generates a residual interferogram by subtracting the SAR interferogram and the offset tracking surface displacement model, and generates an unwrapped residual interferogram by unwrapping the generated residual interferogram, and an unwrapped interferogram generation unit that generates an unwrapped SAR interferogram by adding the unwrapped residual interferogram to the offset tracking surface displacement model.

10 Claims, 8 Drawing Sheets

(56) References Cited

U.S. PATENT DOCUMENTS

| | | | | |
|---|---|---|---|---|
| 2005/0057391 A1* | 3/2005 | Forsley | ............... | G01S 13/9023 342/25 C |
| 2008/0084564 A1* | 4/2008 | He | ........................... | G01J 3/45 356/456 |
| 2008/0231504 A1* | 9/2008 | Sartor | ..................... | G06T 5/50 700/89 |
| 2011/0163911 A1* | 7/2011 | Costantini | ........... | G01S 13/9023 342/25 C |
| 2012/0188119 A9* | 7/2012 | Costantini | ........... | G01S 13/9023 342/25 C |
| 2014/0191130 A1* | 7/2014 | Zhao | ..................... | G01N 21/35 250/338.5 |
| 2016/0033639 A1* | 2/2016 | Jung | ................... | G01S 13/9023 342/25 C |

FOREIGN PATENT DOCUMENTS

| | | | | |
|---|---|---|---|---|
| KR | 10-1111689 B1 | 2/2012 | | |
| KR | 20140086320 A | * 7/2014 | ......... | G01S 13/9023 |
| KR | 1020140086320 A | 7/2014 | | |
| KR | 20160016240 A | * 2/2016 | ......... | G01S 13/9023 |
| KR | 1020160016240 A | 2/2016 | | |
| KR | 20170106868 A | * 9/2017 | ............. | G01S 13/90 |
| KR | 1020170106868 A | 9/2017 | | |
| KR | 10-1804522 B1 | 12/2017 | | |

* cited by examiner

METHOD AND APPARATUS FOR PHASE UNWRAPPING OF SYNTHETIC APERTURE RADAR (SAR) INTERFEROGRAM BASED ON SAR OFFSET TRACKING SURFACE DISPLACEMENT MODEL

TECHNICAL FIELD

The present disclosure relates to a method and apparatus for phase unwrapping of Synthetic Aperture Radar (SAR) interferogram based on SAR offset tracking surface displacement model, and more particularly, to a method and apparatus for reducing an unwrapping error of SAR interferogram based on an offset tracking surface displacement model, for an area with large or complex surface displacement.

BACKGROUND ART

Interferometric Synthetic Aperture Radar (InSAR) has been recently developed, which is a technique that has been used to observe surface displacement with several centimeters of observation precision over a large area of several tens of $km^2$ or more in two dimensions using the phase information of two SAR images taken at different times.

For the past 15 years, radar interferometry have been utilized to study a variety of surface displacement mechanisms, including earthquakes, volcanoes, glaciers, landslides, groundwater pumping, landfill settlements, abandoned mine settlements, and the like. The data generated by the radar interferometry is called an SAR interferogram, and based on this, the precise surface displacement can be observed in the line-of-sight (LOS) direction of the satellite radar.

Since this technique can only observe one-dimensional surface displacements in the LOS direction, there is a limit that it cannot be used in the 3D analysis of surface displacement mechanisms in seismicity, volcanic eruption, landslide, glacier movement, and the like. Accordingly, many researchers have been actively studying ways to observe surface displacements in 2D and even 3D.

For example, Korean Patent No. 10-1111689, entitled "The method for three-dimensional deformation measurement and the apparatus thereof", discloses a technique that utilizes the phase information of SAR image pairs respectively acquired in the ascending and descending orbits of SAR to generate SAR interferogram (SAR) and multiple aperture SAR interferometry (MAI) interferogram and combine the same so as to extract 3D surface displacement.

The technology of the above Korean patent has the advantage of being able to observe precise surface displacement by use of the phase information, but since the computed surface displacement observation result is wrapped to $(-\pi, \pi]$, the SAR phase unwrapping process must be performed for the area with surface displacement beyond this constraint. But there is issue with this process. That is, when the speed of displacement is fast and in complex cases, it is impossible to observe the surface displacement properly by applying only the conventional phase unwrapping processing algorithm.

In more detail, an unwrapping error may occur when converting a phase component wrapped to $(-\pi, \pi]$ into a surface displacement component during InSAR process. The unwrapping error is particularly large when the surface scattering characteristics are greatly changed at two acquisition times so that the decorrelation between the SAR interferometric pair is increased, or when the surface displacement component between the SAR interferometric pair is very large so that the high frequency component is increased. This unwrapping error has a great influence on the degradation of the InSAR observation accuracy.

The SAR offset tracking method is known as a technique that is capable of overcoming the limit of InSAR described above. The method first determines the sizes of the displacement estimated kernels for SAR intensity image pair obtained at different times in the same area, and then computes difference in the locations of the pixels of the correlation peaks between respective kernels by applying the intensity cross-correlation, which is the technique that computes the correlation between all horizontal and vertical pixels in two images. The surface displacement can be computed by multiplying the computed pixel position difference by the pixel-spacing of the SAR image in the azimuth and range directions. Therefore, the observation precision of offset tracking method is greatly influenced by the resolution of SAR. The general understanding is that it has 3 to 4 times higher observation precision than InSAR. Since the SAR offset tracking method does not require the phase unwrapping process despite the relatively poor observation precision, there is an advantage that there is no unwrapping error. Therefore, with this method, large-scale, high-speed surface displacement can be observed effectively.

Meanwhile, referring to Korean Patent No. 10-1804522, entitled "Apparatus and method for SAR offset tracking using multiple-displacement estimated kernel", there is an example that a method for increasing the number of effective pixels and observing a detailed level of surface displacement by utilizing displacement estimated kernels of various sizes has been adapted in the displacement estimation using SAR offset tracking method, thus improving the observation precision compared to the related offset tracking method. Nevertheless, the technique is known to have a lower level of observation precision than the surface displacement observation using InSAR.

In summary, the surface displacement observation method utilizing SAR uses information on the phase and intensity of SAR, respectively. The InSAR utilizing phase and the SAR offset tracking technique utilizing intensity are selectively utilized to observe precise surface displacement or large surface displacement, respectively.

Considering the characteristics of each conventional SAR-based surface displacement observation methods, there is a growing demand for a technique capable of measuring precise surface displacement at the level of InSAR even for large surface displacement.

DETAILED DESCRIPTION OF INVENTION

Technical Problem

An object of the present disclosure is to precisely observe the surface displacement for an area where large-scale, high-speed surface displacement occurs.

An object of the present disclosure is to develop a technology for generating a surface displacement model and unwrapping SAR interferogram by using SAR offset tracking method that is effective for large-scale, high-speed surface displacement observation.

An object of the present disclosure is to develop a method that is more effective than the related unwrapping method that unwraps the wrapped phase component of the related SAR interferogram.

An object of the present disclosure is to solve the problem of degradation of the quality and observation error of the surface displacement map generated during the phase unwrapping process of the InSAR.

An object of the present disclosure is to generate a precise surface displacement image by reducing the unwrapping error, so as to utilize the image in the field of disasters having large-scale, high-speed surface displacement such as volcanic eruption and earthquake.

Technical Solution

In order to solve the technical problems mentioned above, an apparatus according to the present disclosure may include a Synthetic Aperture Radar (SAR) image acquisition unit that acquires two SAR images of a same object acquired at different times, a single look complex (SLC) image production unit that produces two SLC images corresponding to each of the two SAR images, an interferogram production unit that generates an SAR interferogram using SAR interferometry for the two SLC images, a surface displacement model production unit that produces an offset tracking surface displacement model using SAR offset tracking method for the two SLC images, an unwrapped residual interferogram generation unit that generates a residual interferogram by subtracting the SAR interferogram and the offset tracking surface displacement model, and generates an unwrapped residual interferogram by unwrapping the generated residual interferogram, and an unwrapped interferogram generation unit that generates an unwrapped SAR interferogram by adding the unwrapped residual interferogram to the offset tracking surface displacement model.

The surface displacement model production unit may include an offset tracking surface displacement image production unit that produces an SAR offset tracking surface displacement image using the offset tracking method for the two SLC images, an offset tracking surface displacement image correction unit that corrects a terrain effect on the SAR offset tracking surface displacement image by utilizing a linear model, and an offset tracking surface displacement image smoothing unit that reduces a noise component present in the offset tracking surface displacement image to produce an SAR offset tracking surface displacement model.

The offset tracking surface displacement image production unit may produce the SAR offset tracking surface displacement image by computing two-dimensional (2D) surface displacements in azimuth and range directions using a multiple-displacement estimated kernel based on the two SLC images, averaging the 2D surface displacements respectively, and estimating the 2D surface displacements in the final azimuth and range directions.

The offset tracking surface displacement image smoothing unit may produce the offset tracking surface displacement model by reducing noise components present in the offset tracking surface displacement image using non-local means filter.

The offset tracking surface displacement image smoothing unit may obtain an area having a difference value of subtracting a first image and a second image equal to or greater than a predetermined reference, in which the first image is obtained by applying the non-local means filter to the offset tracking surface displacement image and the second image is obtained by applying the median filter to the offset tracking surface displacement image, and produce the offset tracking surface displacement model by masking out the obtained area from the first image and filling the masked-out area in consideration of value of a peripheral pixel.

The unwrapped interferogram generation unit may generate the residual interferogram by wrapping and complex conjugating the offset tracking surface displacement model, and complexly multiplying by the SAR interferogram.

The apparatus may further include an interferometric surface displacement image generation unit that generates an SAR interferometric surface displacement image by converting the unwrapped SAR interferogram expressed in phase in accordance with wavelength of the SAR image.

In order to solve the technical problems mentioned above, a method according to the present disclosure may include acquiring two Synthetic Aperture Radar (SAR) images of a same object acquired at different times, producing two single look complex (SLC) images corresponding to each of the two SAR images, generating an SAR interferogram using SAR interferometry for the two SLC images, producing an offset tracking surface displacement model using SAR offset tracking method for the two SLC images, generating a residual interferogram by subtracting the SAR interferogram and the offset tracking surface displacement model, and generating an unwrapped residual interferogram by unwrapping the generated residual interferogram, and generating an unwrapped SAR interferogram by adding the unwrapped residual interferogram to the offset tracking surface displacement model.

Advantageous Effects

The present disclosure has an effect that it is possible to precisely observe the surface displacement for an area where large-scale, high-speed surface displacement occurs. The present disclosure has an effect that it is possible to effectively unwrap the SAR interferogram using the surface displacement image through the SAR offset tracking method. The present disclosure has an effect that it is possible to effectively observe the surface displacement when the phase unwrapping method of SAR interferogram is not applied effectively because of a high decorrelation between the SAR image pair due to a very large surface displacement. The present disclosure has an effect that it is possible to acquire a higher quality radar image for the image of an area where the interferogram generation is impossible, including areas with large-scale, high-speed surface displacement. The present disclosure relates to a source technology that can improve the quality of SAR surface displacement image, and has an effect that can be applied to various environmental and disaster observation fields that can use the source technology, such as observation of surface displacement due to volcanic eruption and earthquake, landslide observation, glacier speed observation.

DETAILED DESCRIPTION

The terms and words used in the present disclosure and claims should not be construed as limited to ordinary or dictionary meanings, but should be interpreted as the meaning and concept in accordance with the principle that the inventor can appropriately define the concept of the term in order to explain the inventive concept in the best way as possible.

Accordingly, while the embodiments described herein and the configurations shown in the drawings are the most preferred embodiments of the present disclosure, these do not represent all of the technical ideas of the present disclosure, and therefore, it should be understood that various equivalents and modifications are possible.

The expressions used herein are only for describing certain exemplary embodiments, and not intended to limit the scope of the disclosure. Unless otherwise specified, a singular expression includes a plural expression. The expression "comprise" or "have" as used herein is intended to designate an existence of steps, operations, elements, components or a combination of these, and accordingly, this should not be understood as precluding an existence or a possibility of adding one or more of other characteristics, numbers, steps, operations, elements, components or a combination of these.

Hereinafter, preferred embodiments of the present disclosure will be described in detail with reference to the accompanying drawings. In the following description of the present disclosure, detailed description of known functions and configurations incorporated herein will be omitted when it may make the subject matter of the present disclosure rather unclear. In addition, in describing the embodiments of the present disclosure, specific numerical values are merely examples.

Figure 1:
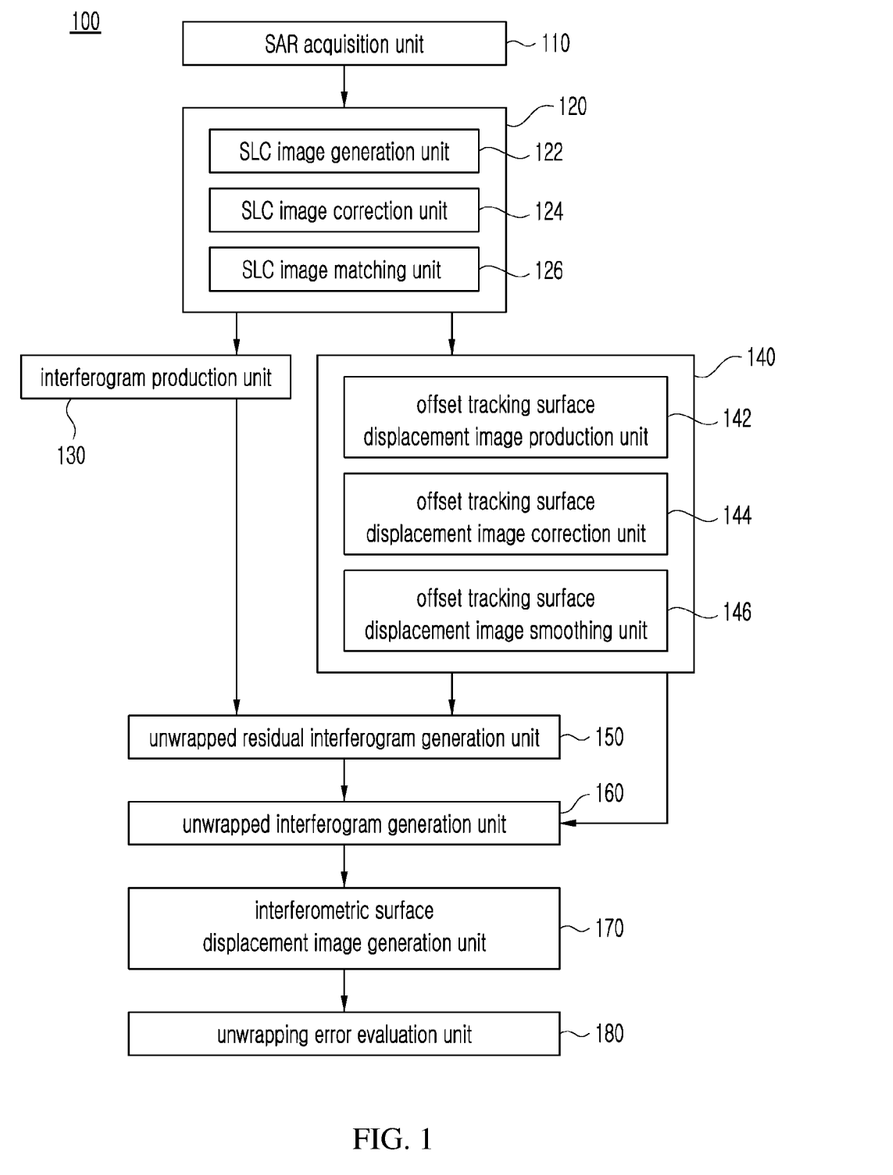
FIG. 1 is a diagram schematically showing a configuration of a phase unwrapping apparatus for SAR interferogram based on an SAR offset tracking surface displacement model according to an embodiment of the present disclosure.

FIG. 1 is a diagram schematically showing a configuration of a phase unwrapping apparatus for SAR interferogram based on an SAR offset tracking surface displacement model according to an embodiment of the present disclosure.

Referring to FIG. 1, the phase unwrapping apparatus 100 for SAR interferogram based on SAR offset tracking surface displacement image according to the present disclosure may include an SAR acquisition unit 110, an SAR image production unit 120, an interferogram production unit 130, a surface displacement model production unit 140, an unwrapped residual interferogram generation unit 150, an unwrapped interferogram generation unit 160, an interferometric surface displacement image generation unit 170, and an unwrapping error estimation unit 180. Depending on the embodiments, some components such as the interferometric surface displacement image generation unit 170, the unwrapping error estimation unit 180, and the like may not be included.

The SLC image production unit 120 may include a single look complex (SLC) image generation unit 122, an SLC image correction unit 124, and an SLC image matching unit 126.

The SAR offset tracking surface displacement model production unit 140 may include an offset tracking surface displacement image production unit 142, an offset tracking surface displacement image correction unit 144, and an offset tracking surface displacement image smoothing unit 146. The SAR acquisition unit 110 acquires SAR images with the same orbital and acquisition systems. That is, the SAR acquisition unit 110 acquires two SAR images acquired at different times with the same orbital and acquisition systems.

Most of the SAR orbital systems employ the polar orbital systems to acquire images all around the globe, and among these polar orbital systems, images with the same orbit are considered. In addition, 'Stripmap', which is a basic radar satellite image acquisition system, is considered. With the Stripmap acquisition system, the time between the satellite emitting the radar wave at a certain angle while orbiting and acquiring the return signal is the range of satellite image acquisition. For this reason, images acquired by the Stripmap acquisition system can guarantee a certain quality in the azimuth direction. In the embodiments of the present disclosure, Stripmap, which is a commonly utilized acquisition system, is considered.

The SLC image production unit 120 includes the SLC image generation unit 122, the SLC image correction unit 124, and the SLC image matching unit 126.

The SLC image generation unit 122 compresses the raw data recorded by the SAR sensor in the azimuth and range directions to generate a SAR SLC image that is in the form of single look complex.

The SAR transmits signals from satellites and acquires data from signals reflected back from the surface material. Therefore, the SARs are actively utilized in various fields because they are not affected by weather conditions and day and night, unlike optical satellites that passively receive the earth's radiant energy generated from solar light sources to acquire data therefrom. Unlike optical data, image data acquired by SAR is recorded in an SLC format that includes a magnitude value of reflectance information determined by roughness and dielectric constant of the surface and a phase value representing distance information to the surface. The method of generating SAR SLC image in single look complex form by compressing the single look complex raw data recorded by the SAR sensor in the azimuth and range directions is well known in the field of the present disclosure, and so the description thereof will be omitted.

The SLC image correction unit 124 corrects an error generated due to a difference in acquisition geometry between the two generated SLC images by using a Doppler centroid conversion method.

That is, the SLC image correction unit 124 corrects the acquisition geometries of the two SLC image pairs by determining and utilizing a common Doppler bandwidth of the SAR SLC image pairs.

In detail, the SAR SLC image pairs produced by the SLC image production unit 122 are two SAR images acquired at different times, and are acquired using a radar sensor usually consisting of one radar transmitter and receiver on different days, the acquisition geometry is different from each other due to the difference in satellite position and posture at the time of each acquisition. Different acquisition geometries in SAR images mean different squint angles, and this change in squint angle changes the Doppler centroid.

The common Doppler bandwidth of the SAR SLC image pair generated by the SLC image generation unit 122 may be expressed by Mathematical Equation 1 below.

$$\Delta f'_D = \Delta f_D - |f_{DC,m} - f_{DC,s}| \qquad \text{[Mathematical Equation 1]}$$

where $\Delta f'_D$ represents a common Doppler bandwidth, $\Delta f_D$ represents an effective Doppler bandwidth, $f_{DC,m}$ represents the Doppler centroid of the master image, and $f_{Dc,s}$ represents the Doppler centroid of the slave image.

The Doppler centroid conversion method of the SAR image is a known technology, and since this is described in more detail in Korean Patent No. 10-1315243, this patent document will be referenced for details, and description thereof will be omitted.

The SLC image matching unit 126 matches the SLC image by applying the intensity cross-correlation method.

In more detail, it estimates the displacement between the two images and performs matching using the same, by applying the intensity cross-correlation method of computing the correlation between all horizontal and vertical pixels in the SAR SLC image pair corrected by the SLC image correction unit 124 while moving the kernels with respect to the entire master and slave images. Here, the correlation between two SLC images may be computed using normal correlation coefficient, and this normal correlation coefficient ρ(u, v) is determined by using Mathematical Equation 2 below.

$$\rho(u, v) = \frac{\sum_i \sum_j [m(i, j) - \overline{m}][s(i, j) - \overline{s}]}{\sqrt{\sum_i \sum_j [m(i, j) - \overline{m}]^2} \sqrt{\sum_i \sum_j [s(i, j) - \overline{s}]^2}} \qquad \text{[Mathematical Equation 2]}$$

where ρ(u, v) represents the intensity correlation coefficient between the kernel center pixels of the master and slave images, and m(i, j) represents the intensity value at pixel position i in the range direction and pixel position j in the azimuth direction of the master image, s(i, j) represents the intensity value at pixel position i in the range direction and pixel position j in the azimuth direction of the slave image, represents the average intensity value for all the pixels in the kernels of the master image, and represents the average intensity value for all the pixels in the kernels of the slave image. In this example, the image to be matched is called a master image, and generally defined as an SLC image acquired earlier in time, and an image that is a reference in matching is called a slave image and is generally defined as an SLC image acquired later in time.

That is, the displacement between two SLC images is estimated by finding the pixel with the largest normal correlation coefficient in the slave image compared to the master image, and matching the SLC image by using such estimated displacement. Since the intensity cross-correlation method is a known technique, detailed description thereof will be omitted.

The interferogram production unit 130 produces an SAR interferogram by applying the InSAR to the SAR SLC image pair produced by the SLC image production unit 120. Since the SAR interferogram production method is well-known in the field of the present disclosure, description thereof will be omitted.

The surface displacement model production unit 140 produces a surface displacement model for reducing the unwrapping error of the SAR interferogram produced by the interferogram production unit 130.

In more detail, since the SAR interferogram produced by the interferogram production unit 130 includes a phase value and the phase value is wrapped to one wavelength, in order to extract, from the phase, the distance difference between the master and slave images, that is, to extract the surface displacement, the phase unwrapping process is required. However, when the surface displacement is large, an error occurs in the phase unwrapping process of the SAR interferogram, and thus there is a limit that it is difficult to accurately observe the surface displacement. Therefore, for effective phase unwrapping of the SAR interferogram, the SAR offset tracking surface displacement model production unit 140 generates a surface displacement model through the SAR offset tracking method that can effectively observe a large-scale, high-speed surface displacement.

The surface displacement model production unit 140 may include the offset tracking surface displacement image production unit 142, the offset tracking surface displacement image correction unit 144, and the offset tracking surface displacement image smoothing unit 146.

The offset tracking surface displacement image production unit 142 produces an SAR offset tracking surface displacement image by applying the offset tracking method to the SAR SLC image pair produced by the SLC image production unit 120.

In more detail, when producing the offset tracking surface displacement image, the intensity cross-correlation method for obtaining the correlation coefficient is applied, in which, in order to compensate the conventional method of determining and applying one kernel size in azimuth and range directions, the offset tracking method may be applied, which performs the intensity cross-correlation method with multiple kernel sizes.

This multi-kernel offset tracking method uses multi-window kernels for SLC image pairs to compute 2D displacements in azimuth and range directions for each kernel. In this case, the intensity cross-correlation method for obtaining a correlation coefficient of the SLC image pair is applied, in which the offset tracking method performing intensity cross-correlation with multiple kernel sizes may be applied. That is, with respect to the SLC image pair, the offset tracking method that performs intensity cross-correlation while changing the size of the displacement estimated kernel is repeatedly applied. Through this, the displacements in the range and azimuth directions according to the displacement estimated kernel sizes are computed, respectively. In general, the size of the displacement estimated kernel is determined based on the spatial resolution of the SLC image in the range and azimuth directions. After overlapping the 2D surface displacement values of the azimuth and range directions according to the estimated kernel size to remove the outliers, the average is computed to estimate the 2D surface displacement in the azimuth and range directions. This is a known technology, and since this is described in more detail in Korean Patent No. 10-1804522, this patent document will be referenced for details, and description thereof will be omitted.

The offset tracking surface displacement image correction unit 144 corrects the terrain effect by utilizing a linear model with respect to the SAR offset tracking surface displacement image produced by the offset tracking surface displacement image production unit 142.

The offset tracking surface displacement image smoothing unit 146 produces an SAR offset tracking surface displacement model by reducing noise component present in the offset tracking surface displacement image by utilizing a non-local means filter and a median filter.

In more detail, since the conventional InSAR reduces the terrain effect and the residual orbital distortion, it has difference from the offset tracking observation result produced by the offset tracking surface displacement image production unit 142. These distortion components may exacerbate the unwrapping error in areas with fast-changing displacement or complex areas in the image, which needs corrections.

In addition, while the precision of SAR offset tracking is improved in Korean Patent No. 10-1804522, it still has too many noise components to be utilized as the SAR offset tracking surface displacement model. These noise components appear as an abrupt larger value than the peripheral pixels, and this value may cause unwrapping error in the process of unwrapping the residual surface displacement image. For this reason, a process is needed to produce a good quality model, and for this process, non-local means filter and median filter may be utilized. Of course, depending on embodiments, it is also possible to produce the SAR offset tracking surface displacement model by applying the non-local means filter alone.

The unwrapped residual SAR interferogram generation unit 150 generates an unwrapped residual interferogram by subtracting the SAR interferogram and the offset tracking surface displacement model produced by the interferogram production unit 130, the surface displacement model production unit 140, and generates an unwrapped residual interferogram by unwrapping the residual interferogram.

The unwrapped interferogram generation unit 160 may generate an unwrapped SAR interferogram with reduced unwrapping error by compensation, by adding the unwrapped residual interferogram generated by the unwrapped residual SAR interferogram generation unit 150 to the surface displacement model produced by the SAR offset tracking surface displacement model production unit 140.

The interferometric surface displacement image generation unit 170 may generate the SAR interferometric surface displacement image by converting the unwrapped SAR interferogram generated by the unwrapped interferogram generation unit 160 (S270). Since the unwrapped SAR interferogram is the data expressed in phases, this requires a process of conversion in accordance with the wavelength of the SAR images that are utilized to observe the actual surface displacement. This will be described in detail below.

In order to evaluate the unwrapping error remaining in the SAR interferometric surface displacement image that is reduced of the unwrapping error by the interferometric surface displacement image generation unit 170, the unwrapping error evaluation unit 180 may evaluate the unwrapping error of the corrected SAR interferometric surface displacement image by utilizing an offset tracking surface displacement image in which unwrapping error does not occur.

The phase unwrapping apparatus for SAR interferogram based on the SAR offset tracking surface displacement model according to an embodiment of the present disclosure has the following advantages. First, with respect to the problem that it is impossible to generate the interferogram due to the unwrapping error in the SAR interferogram caused by the large-scale, high-speed surface displacement, it is possible to reduce the unwrapping error using the surface displacement model generated by the SAR offset tracking method. Second, since InSAR and the phase unwrapping process with high observation precision are not necessary, it is possible to acquire a better surface displacement image by combining the SAR offset tracking method which is suitable for large-scale, high-speed surface displacement observation and thus providing an effect of observing various types of complex displacements with high observation precision. Finally, it is possible to produce a precise surface displacement image with the method of reducing unwrapping error using offset tracking surface displacement model with respect to areas with large-scale, high-speed surface displacements such as volcanic eruptions and earthquakes which are problematic in generating SAR interference displacement map.

Hereinafter, the operation flow chart according to the present disclosure will be briefly described based on the details described above.

Figure 2:
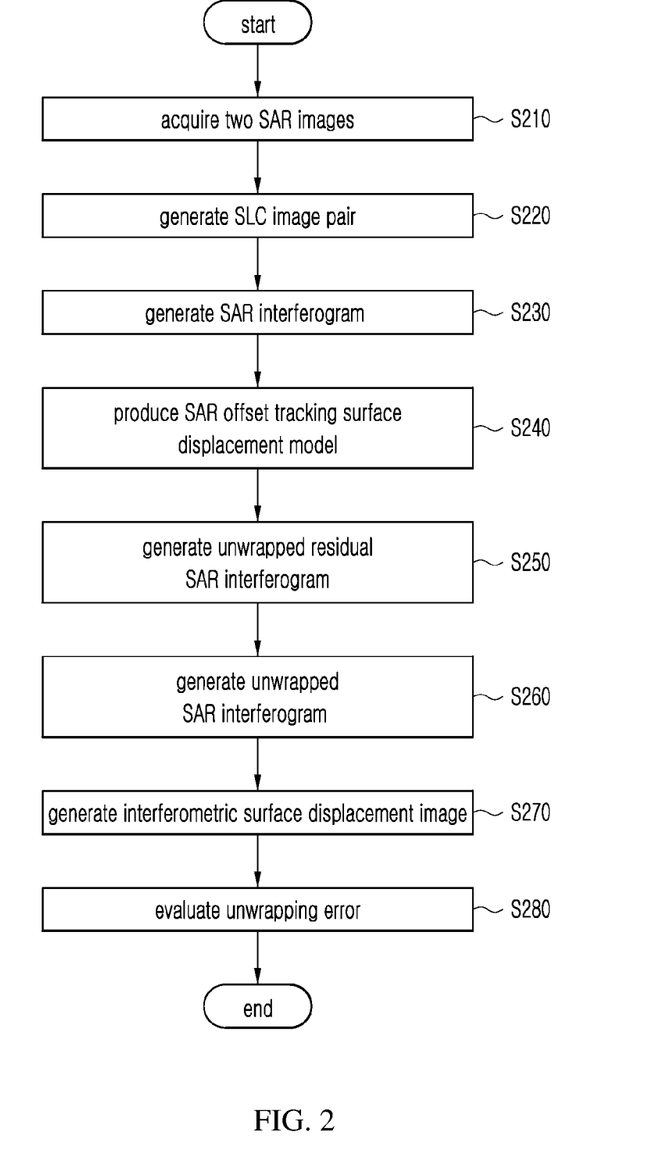
FIG. 2 is a flowchart showing a phase unwrapping method for SAR interferogram based on an SAR offset tracking surface displacement model according to an embodiment of the present disclosure.

FIG. 2 is a flowchart showing a phase unwrapping method and apparatus for SAR interferogram based on SAR offset tracking surface displacement model according to an embodiment of the present disclosure.

Referring to FIGS. 1 and 2, first, two SAR images are acquired by acquisition from a same target, for example, from a specific object at different times (S210).

That is, the satellite radar having the same orbital system and image acquisition system acquires two SAR images of the same specific object at different times. In this case, when the orbital system and the image acquisition system acquire different images, it is not possible to adopt the SAR offset tracking method, which is a method of matching the two images and then estimating the relative displacement of the slave image from the master image, thus leading to inability to perform 2D surface displacement observation.

In more detail, most SAR orbital systems employ a polar orbital system that orbits over the Antarctic and Arctic to acquire images around the globe, and among these polar orbital systems, images acquired by the polar orbital systems with the same orbit should be considered. In addition, examples of the radar satellite image acquisition system include ScanSAR, Spotlight, Stripmap, and the like, and the images having the same acquisition system among these acquisition systems should be considered. In an embodiment of the present disclosure, Stripmap is considered, which is a widely used acquisition system. With the Stripmap acquisition system, the time between the satellite emitting the radar at a certain angle while orbiting and acquiring the return signal is the range of satellite image acquisition. For this reason, images acquired by the Stripmap acquisition system can guarantee a certain quality in the azimuth direction.

Next, an SLC image is produced from the two SAR images, respectively (S220).

In detail, SLC images are generated from the two SAR images acquired at S210, then a common Doppler bandwidth of the generated SLC image pair is obtained to correct the SLC images, and finally, the corrected SLC image pair are matched to produce two SLC images to which the offset tracking method may be applied.

Since the satellite radar transmits signals and acquires data from microwave signals reflected back from the surface material, it is not affected by weather conditions and day and night, and accordingly, actively utilized in various fields. The image data acquired by SAR is recorded in an SLC format that includes a magnitude value of reflectance information determined by roughness and dielectric constant of the surface and a phase value representing distance information to the surface. The two SLC SAR images acquired by the SAR sensors are compressed in the azimuth and range directions to generate SLC image in the single look complex form. Since the method of generating SLC image is well known in the field of the present disclosure, description thereof will be omitted.

The error in the SLC images caused by a difference in acquisition geometries between SLC images is corrected using a common Doppler bandwidth between SLC images.

Meanwhile, Mathematical Equation 1 describes a common Doppler bandwidth between SLC images, and a method of reducing the acquisition geometry error between the SLC images using the same is described in more detail in Korean Patent No. 10-1315243 as a well-known technique, and thus this will be reference to for further details, and description thereof will be omitted.

In addition, the intensity cross-correlation is applied to the corrected SLC images to match the SLC images.

In more detail, the displacement between the two images are estimated and matching is performed using the same, by applying the intensity cross-correlation method of computing the correlation between all horizontal and vertical pixels in the corrected SAR SLC images while moving the kernels with respect to the entire master and slave images.

Meanwhile, Mathematical Equation 2 describes a normal correlation coefficient for determining the correlation between two SLC images. Since this has been described in detail above, the above description will be referenced for details.

Next, the SAR interferogram is generated by applying the InSAR based on the SAR image which is produced so that the InSAR and the offset tracking method are applicable thereto (S230). An interferogram is generated by computing a phase difference, by multiplying SLC image pairs in single look complex form including a magnitude value of reflectivity information and a phase value of distance information described above, by a conjugate complex number. Since the SAR interferogram generation method is well known in the field of the present disclosure, description thereof will be omitted.

Next, based on the SAR image that is produced so that the InSAR and the offset tracking method are applicable thereto, an SAR offset tracking surface displacement image is generated by the application of the SAR offset tracking method, and the surface displacement model is generated by filtering the generated offset tracking surface displacement image to reduce noise (S240). Since the SAR offset tracking surface displacement image generation method is a well-known technique as described in more detail in Korean Patent No. 10-1804522, this patent document will be referenced for details.

The non-local means filter and median filter are utilized to generate the surface displacement model. The non-local means filter noises noise component in the image by considering correlation of all pixels, without losing information about boundary. Therefore, the filter is suitable for generating a model for its advantage of keeping boundaries without reducing the amount of displacement even when filtering is performed on the areas with large displacements in the image. However, the non-local means filter is limited in that it sharpens even the boundary of noise components. Accordingly, the median filter may be utilized together to overcome this limit.

For example, an area with a difference of subtracting a first image from a second image is equal to or greater than a predetermined reference is acquired, in which the first image is obtained by applying the non-local means filter to the SAR offset tracking surface displacement image generated by applying the SAR offset tracking method, and the second image is obtained by applying the median filter to the offset tracking surface displacement image. The offset tracking surface displacement model may be produced by masking out the obtained area from the first image and filling the area masked out from the first image in consideration of the value of peripheral pixels.

Next, a residual interferogram is generated by subtracting the SAR interferogram and the SAR offset tracking surface displacement model generated through S230 and S240 and an unwrapped residual interferogram is generated by unwrapping the residual interferogram (S250). In more detail, the surface displacement model generated through S240 is wrapped and then complex conjugated, and complexly multiplied by the SAR interferogram generated at S230 to generate a residual interferogram, and then only the generated residual interferogram, that is, only the residual displacement may be unwrapped to generate the unwrapped residual interferogram.

Next, the unwrapped SAR interferogram may be generated by compensation, by adding the unwrapped residual interferogram generated at S250 to the offset tracking surface displacement model (S260).

In detail, at S260, the SAR offset tracking surface displacement image is compensated again for the unwrapped residual interferogram, which is obtained by unwrapping the residual surface displacement between the SAR interferogram at S240 that has a higher observation precision and the SAR offset tracking surface displacement model at S250 that has a relatively lower observation precision than InSAR, but does not require phase unwrapping process. Through this process, the problem that the interferogram cannot be generated due to the unwrapping error in the SAR interferogram caused by the large-scale, high-speed surface displacement may be overcome by compensating with the surface displacement model generated by the SAR offset tracking method, and in other words, the unwrapping error in SAR interferograms may be reduced.

Finally, the unwrapped interferogram generated at S260 is converted using Mathematical Equation 3 to generate an SAR interferometric surface displacement image (S270). The phase $\Phi I_{InSAR}$ of the unwrapped SAR interferogram is converted into a surface displacement $X_{InSAR}$ according to Mathematical Equation 3 so that the final SAR interferometric surface displacement image is generated.

$$X_{InSAR} = -\frac{\Phi \lambda}{4\pi} \qquad \text{[Mathematical Equation 3]}$$

Finally, the error reduction method may be evaluated by analyzing a profile of the SAR interferometric surface displacement image having a reduced unwrapping error (S280). In more detail, the unwrapping error of the corrected SAR interferometric surface displacement image is evaluated by utilizing an SAR offset tracking surface displacement image in which unwrapping error does not occur, in order to confirm remaining unwrapping error in the SAR interferometric surface displacement image from which the unwrapping error is reduced at S270 (S280). To this purpose, a method is employed, which involves comparison with the conventional unwrapping interferometric surface displacement image and comparison with the field observation data, respectively.

According to the present disclosure, the limit of the InSAR that it cannot accurately observe the surface displacement for the area with the large-scale, high-speed surface displacements due to the unwrapping error, is addressed, since it is possible to effectively reduce the unwrapping error of satellite radar interferograms using the offset tracking surface displacement model generated by the SAR offset tracking method, which is effective for large-scale, high-speed surface displacement observation. As a result, the quality degradation and observation error of the surface displacement map generated during the phase unwrapping process of the InSAR can be effectively addressed, so that it is possible to acquire a high quality surface displacement image.

In addition, with respect to areas with large-scale, high-speed surface displacements, such as volcanic eruptions and earthquakes, which are problematic in generating surface displacement maps, the present disclosure is characterized in that it is capable of reducing the unwrapping error of SAR interferogram by using the SAR offset tracking surface displacement model, thereby producing an accurate surface displacement image.

Hereinafter, test was conducted to verify the method for reducing the unwrapping error of the SAR interferogram based on the SAR offset tracking surface displacement model according to an embodiment of the present disclosure, the results of which will be described in detail below.

In the test described below, L-band (23.6 cm) ALOS-2 PALSAR-2 data acquired on Feb. 11, 2016 and Jun. 2, 2016 was applied to acquire the surface displacement caused by the Kumamoto earthquake that occurred in April 2016 (The 2016 Kumamoto Earthquake), and the results of the supplemented surface displacement extraction in the LOS direction were verified.

Table 1 below represents the characteristics of the ALOS PALSAR-2 interferometric pair used in the test to apply the method for reducing the unwrapping error of the SAR interferogram based on the SAR offset tracking surface displacement model proposed by the present disclosure. Two images (master image and slave image), taken from the descending orbit, were taken over a 112-day time baseline ($B_T$) with a vertical baseline length of about −74 m and a Doppler centroid (fDC) of −36.7 Hz.

TABLE 1

| Master | Slave | $B_T$ (Days) | $B_\perp$ (m) | $f_{DC}$ (Hz) |
|---|---|---|---|---|
| 2016 Feb. 2011 | 2016 Jun. 2002 | 112 | −74 | −36.7 |

Figure 3:
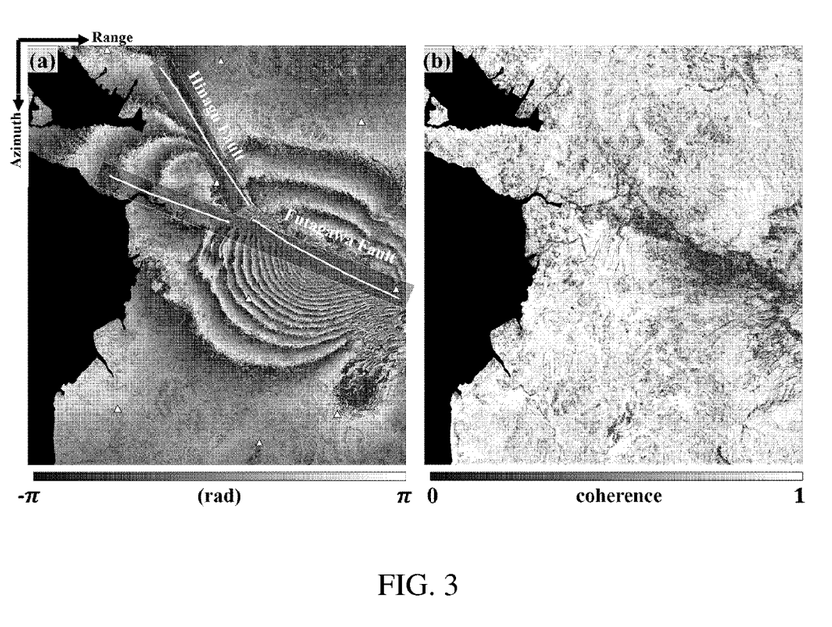
FIG. 3 shows a wrapped SAR interferogram obtained by utilizing the InSAR according to an embodiment of the present disclosure, and interferometric coherence.

FIG. 3 is an image showing an unwrapped SAR interferogram (FIG. 3A) when the general InSAR is applied according to an embodiment of the present disclosure, and the coherence of the SAR interferometric pair (FIG. 3B). Differential interferometry is widely utilized for observing the movement of the surface, but for the area such as the test area that experiences a large amount of change such as a large-scale earthquake, the SAR coherence is reduced as shown in the center of FIG. 3B, resulting in a problem that it is difficult to extract a representative displacement signal with respect to the peripheral pixels during the phase unwrapping process.

Accordingly, the present disclosure produces an SAR SLC image adjusted with the Doppler centroid using ALOS PALSAR-2 data to determine surface displacement. In this case, the SAR SLC image is first generated by the SLC image generation unit 120 of the apparatus 100 according to the present disclosure.

In this case, since the two sheets of SAR SLC data have different Doppler centroids from each other, the SLC of the two images were subjected to filtering of the common Doppler bandwidth of the azimuth direction in order to leave the maximum number of effective pixels in the intensity image. As a result, the signal parts with low correlation between the two images were removed, and then the Doppler centroid determined from this process was used. This may be performed by the SLC image correction unit 124 of the apparatus 100 according to the present disclosure.

After that, the SAR image pair is subjected to fast Fourier transform, and then the images are matched with each other by computing the correlation between the two images using intensity cross-correlation method. This is done by the image matching unit 126 according to the present disclosure.

Then, an SAR interferogram is produced by applying InSAR to the matched two images. This can be performed at the SAR interferogram production unit 130 of the apparatus 100 according to the present disclosure.

Then, the SAR offset tracking method is applied to the matched two images by applying the multiple-displacement estimated kernel. The offset tracking method has a significantly lower precision than that of the conventional InSAR, but there is an effect that the unwrapping error does not occur because it does not go through the phase unwrapping process. The method of measuring a distance between the points showing the highest correlation by applying the intensity cross-correlation method based on the matched image can be performed at the surface displacement model production unit 140 of the apparatus 100 according to the present disclosure.

In this test, the offset tracking displacement images in the azimuth direction were acquired by respectively applying the size of the displacement estimated kernels of 64, 96, 128, 160, 192, 224, and 256 pixels in the azimuth and range directions, respectively. By applying the multiple-displacement estimated kernel instead of the single-displacement estimated kernel to offset tracking, there is an effect that it is possible to properly utilize both the displacement components well observed when using a small kernel and the components observed well when using a large kernel. This can be performed at the SAR offset tracking surface displacement image production unit 142 of the apparatus 100 according to the present disclosure.

Figure 4:
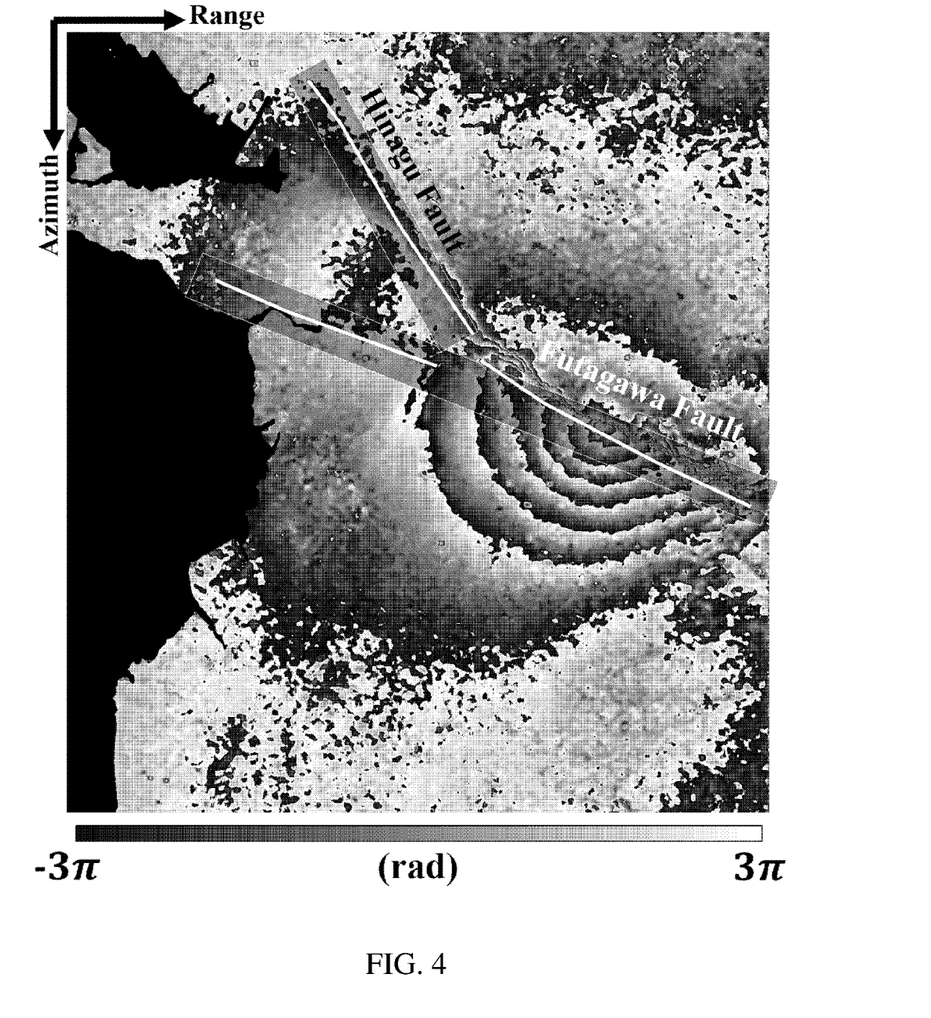
FIG. 4 shows a result of SAR offset tracking surface displacement observation generated in LOS direction according to the related art.

FIG. 4 shows an offset tracking surface displacement image generated afterwards. The offset tracking surface displacement image generated from two satellite images acquired at different times has topographical error and track error components present therein due to the vertical baseline. These distortion components are commonly generated in the surface displacement image generated through InSAR or offset tracking. Since these distortion components act as an error component when deriving a final surface displacement observation result by utilizing SAR, the conventional InSAR corrects these by utilizing the Digital Elevation Model. Likewise, the offset tracking surface displacement image correction unit 144 corrects the terrain and track errors present in the observation result generated by the offset tracking surface displacement image production unit 142.

More specifically, with respect to the pixel value $X_{orig}(i, j)$ in (i, j) of the surface displacement image generated at the offset tracking surface displacement image production unit, a one-dimensional polynomial model including the effect of the Digital Elevation Model DEM(i, j) is generated and corrected as expressed in Mathematical Equation 4 below.

$$X_{cor}(i,j)=X_{orig}(i,j)-[C_0 DEM(i,j)+C_1(i-1)+C_2(j-1)+C_3(i-1)(j-1)+C_4]$$ [Mathematical Equation 4]

where $X_{cor}(i, j)$ is a pixel value in (i, j) of the corrected offset tracking surface displacement image, and $C_n$ (n= 0, . . . 4) is a constant. At this time, $C_n$ (n=0, . . . 4) is determined based on the Digital Elevation Model value and the value of surface displacement image for each pixel.

Figure 5:
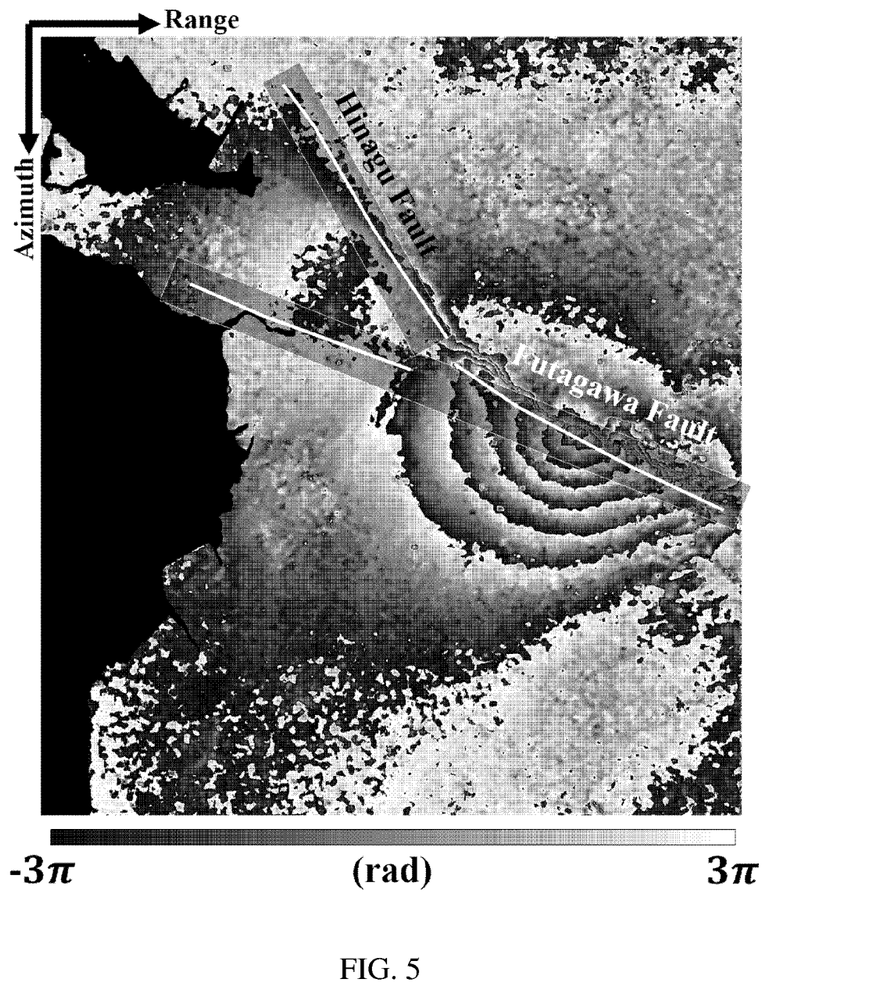
FIG. 5 shows a result of correcting the SAR offset tracking surface displacement image according to an embodiment of the present disclosure.

FIG. 5 shows an offset tracking surface displacement image corrected afterwards. The offset tracking surface displacement image correction unit 144 determines a correction constant and performs correction based on the overall tendency in the image, but there is no effect of reducing local noise. In the present disclosure, since the offset tracking image is utilized as a surface displacement model to reduce the complexity of the SAR interferogram, this local noise form may rather increase the unwrapping error. Therefore, it is necessary to reduce local noise to generate an appropriate offset tracking surface displacement model. The non-local means filter and the median filter are utilized to generate the surface displacement model utilizing offset tracking displacement image. The smooth image, which is obtained by applying a median filter strongly, is subtracted from the image obtained through the non-local means filter, and then an area having a large difference is selected and masked out, and then the masked-out area is filled in consideration of the value of the peripheral pixels to generate a final surface displacement model. This can be performed at the offset tracking surface displacement image smoothing unit 146 of the apparatus 100 according to the present disclosure.

FIG. 6A shows SAR offset tracking surface displacement model according to an embodiment of the present disclosure, FIG. 6B shows unwrapped residual SAR interferogram, FIG. 6C shows result of the unwrapping error reduction according to an embodiment, and FIG. 6D shows surface displacement image of SAR interferogram according to a conventional example.

Each of the drawings will be described in detail below. The offset tracking surface displacement model expresses the same ground displacement, but with the reduced precision compared to the SAR interferogram. Therefore, the SAR residual interferogram may be generated by subtracting the offset tracking surface displacement model from the SAR interferogram generated by the conventional example. The SAR residual interferogram contains the accurate surface displacement component of the related SAR interferogram, but the tendency of surface displacement is greatly reduced. In other words, the complexity of surface displacement is greatly reduced. The SAR unwrapping error tends to occur easily when the surface displacement is large and complex. Accordingly, the unwrapped interferogram generated when the phase unwrapping process is applied to the SAR residual interferogram has a reduced unwrapping error compared to the conventional unwrapped SAR interferogram. This can be performed at the offset tracking surface displacement image smoothing unit 150 of the apparatus 100 according to the present disclosure.

Referring to FIG. 6C, the unwrapped residual SAR interferogram produced according to one embodiment of the present disclosure may be compensated with the offset tracking surface displacement model so that the unwrapped SAR interferogram may be generated. This process can be performed at the unwrapped interferogram generation unit 160 of FIG. 1. In more detail, in this process, the detailed surface displacement component of the SAR interferogram included in the unwrapped residual SAR interferogram and the surface displacement included in the SAR offset tracking surface displacement model are added for each pixel. The unwrapped residual SAR interferogram has a reduced observation accuracy of surface displacement due to the subtraction of the surface displacement model, but has a high precision, while the SAR offset tracking surface displacement model has a reduced observation precision, but is able to express the overall trend of surface displacement. By adding these two together, both the observation accuracy and the precision of the surface displacement may be maintained.

Figure 6:
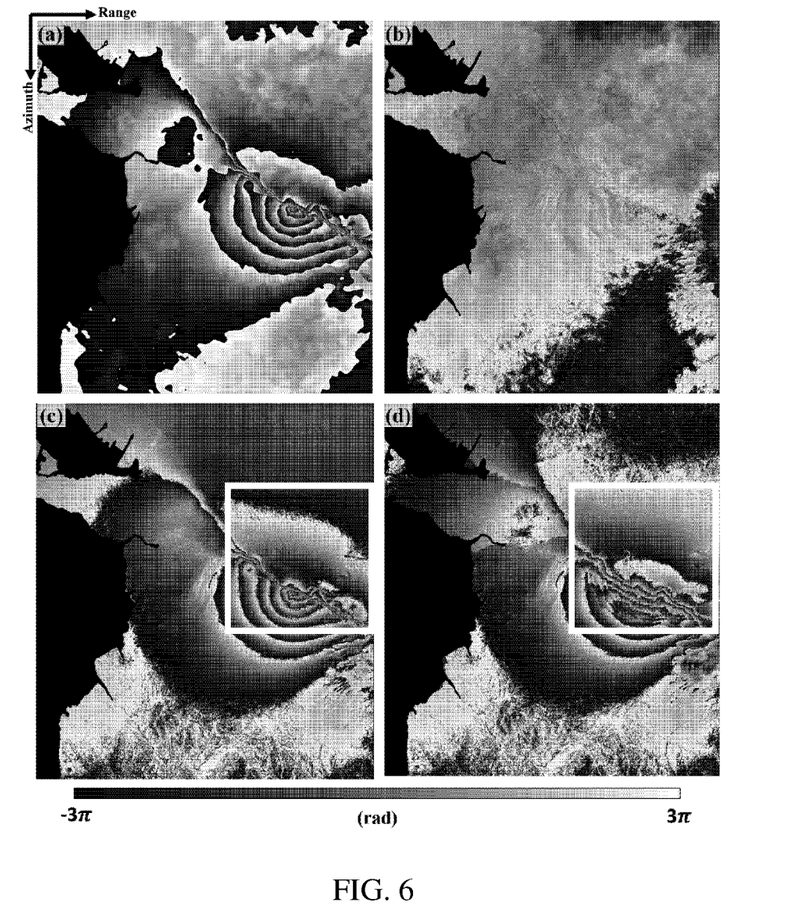
FIG. 6 shows a smoothed image of SAR offset tracking surface displacement, unwrapped residual SAR interferogram, and a result of reducing unwrapping error of SAR interferogram, according to an embodiment of the present disclosure, and a surface displacement image of SAR interferogram according to the related art.

FIG. 6D shows a result of applying a conventional phase unwrapping method to the SAR interferogram produced by the interferogram production unit 130 according to an embodiment of the present disclosure. As can be seen in the white rectangle of FIG. 6, an unwrapping error is generated in an area where the size of displacement is greater than that of the unwrapped interferogram (FIG. 6C) generated by the phase unwrapping method according to the present disclosure, thus hindering proper observation of the surface displacement.

Figure 7:
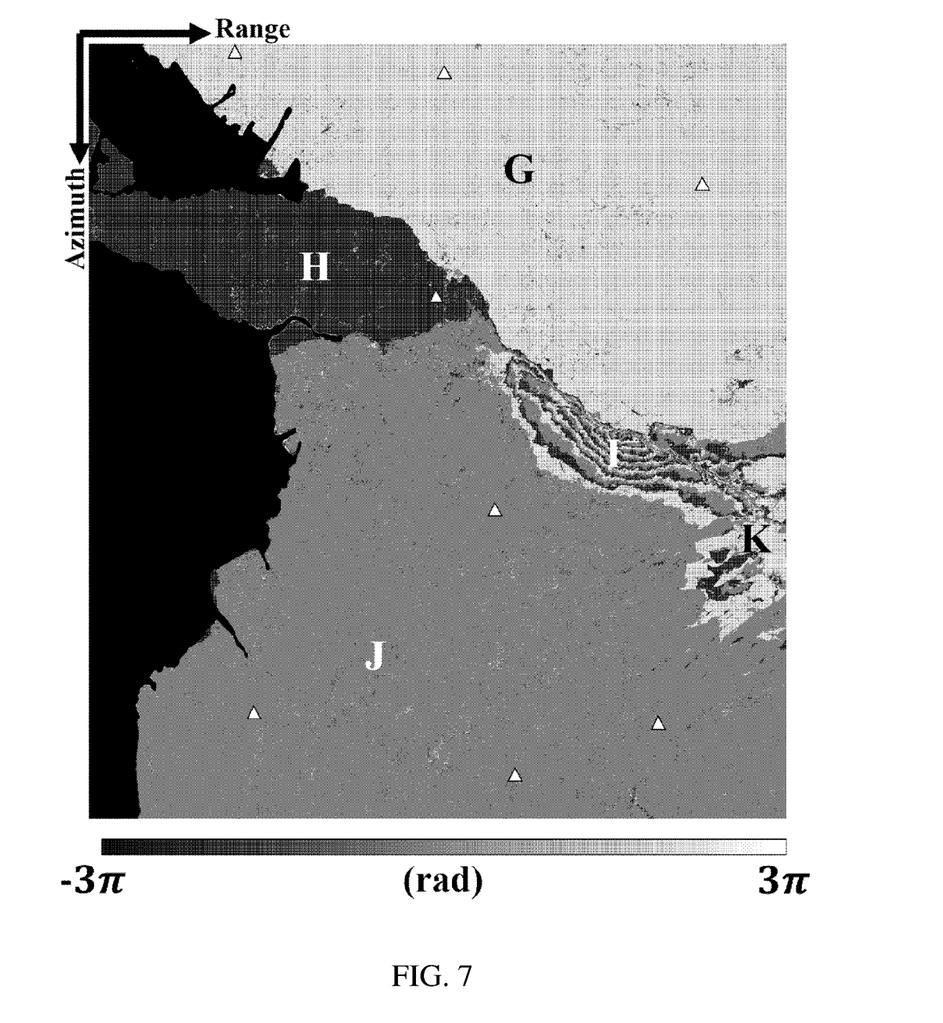
FIG. 7 shows an image obtained by subtracting the result of reducing unwrapping error of SAR interferogram generated according to an embodiment of the present disclosure and a surface displacement image of the SAR interferogram according to the related art.

FIG. 7 shows an image obtained by subtracting an unwrapped interferogram generated by the phase unwrapping method according to the present disclosure and the phase unwrapping method of the related art. In most areas, the difference between the two interferograms is converged to zero, but there are unwrapping errors found in some areas. This is due to the limit of the conventional unwrapping method due to the surface displacement with high change rate and complex surface displacement near the fault zone. In FIG. 7, H and G are where the phase jump effect was found due to incorrect computation of phase ambiguity. The incorrectly computed phase jump components were $-2^{\pi}$ and $-4^{\pi}$, respectively. This jump effect is a well-known process in SAR phase unwrapping process. Meanwhile, the maximum value of the difference image was confirmed in the area I. The difference in the area I is 138.6 radians, which, when substituted into the wavelength of the L-band satellite, corresponds to an error of 260.4 cm of the satellite in the range direction.

Figure 8:
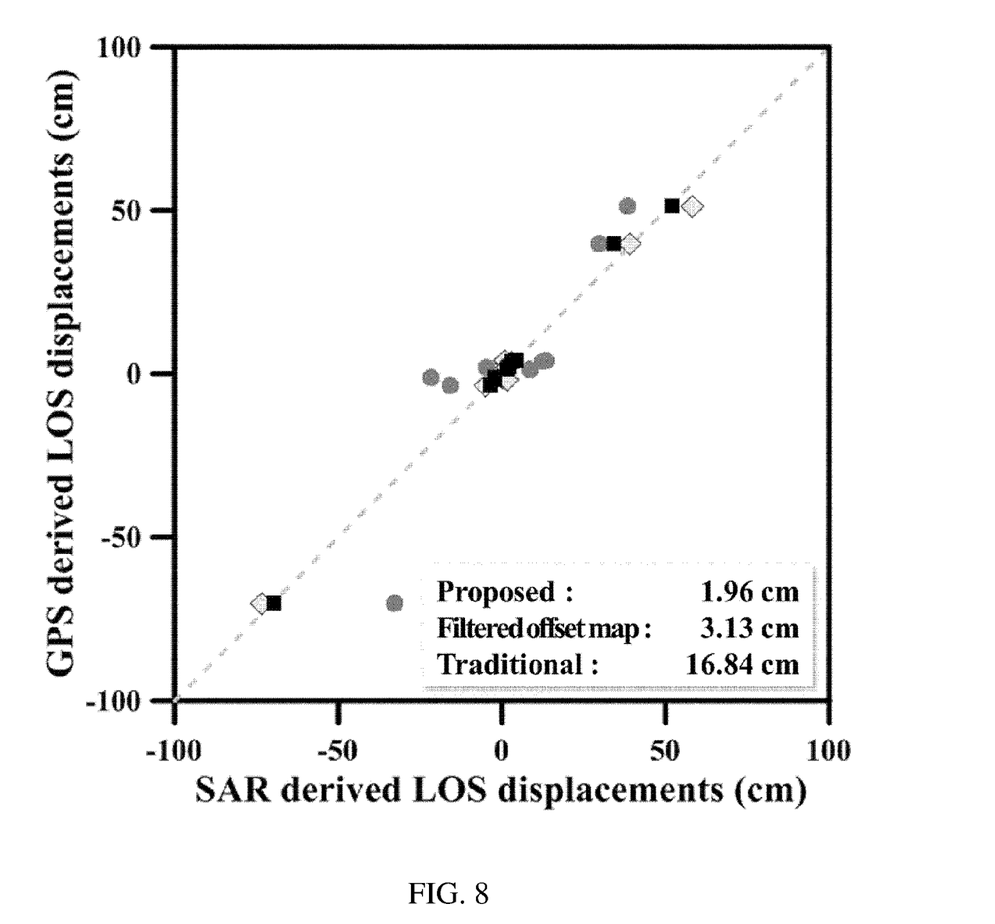
FIG. 8 is a graph showing a result obtained by comparing the result of reducing the unwrapping error of the SAR interferogram generated according to an embodiment of the present disclosure, with a surface displacement observation result of the permanent GPS station.

FIG. 8 shows an evaluation of the error of the SAR surface displacement observation result utilized in one embodiment of the present disclosure, with the surface displacement observation data acquired at the permanent GPS station. First, based on the assumption that the surface displacement observation value of the permanent GPS station is a true value of the surface displacement, the final observation error was evaluated by computing the root mean square error. In addition, the surface displacement observation data of the permanent GPS station was projected in the Line-of-Sight (LOS) direction of the SAR surface displacement in consideration of the utilized SAR acquisition geometry and compared. In addition, in order to compare with the conventional SAR-based surface displacement observation results, the unwrapped interferogram according to the present disclosure, the unwrapped interferogram according to the conventional example, and the offset tracking surface displacement image produced according to Korean Patent No. 10-1804522 entitled "Apparatus and method for SAR offset tracking using a multiple-displacement estimated kernel" were compared, respectively.

As a result, the root mean square error of the surface displacement observation result generated by the phase unwrapping method according to the present disclosure was 1.96 cm, which showed the most accurate surface displacement observation result compared with the permanent GPS station surface displacement observation result, while the root mean square error of the surface displacements generated by the offset tracking method using the multiple-displacement estimated kernel and the conventional unwrapping method were 3.13 cm and 16.84 cm, respectively, which showed detection performances of about 63% and 12% compared with the observation performance of the present disclosure.

The SAR-based surface displacement observation method is the only method that can acquire surface displacement over a large area and is utilized in various geological fields. Among these, InSAR is a technique that utilizes the phase information of SAR, and can observe precise surface displacement, but with its observation value wrapped to (−π, π], it requires the phase unwrapping process in order to observe the large-scale surface displacement beyond this, and in particular, when the displacement is fast changing or complex, it is difficult to observe proper surface displacement due to unwrapping error. Meanwhile, the offset tracking method utilizing the intensity information of SAR is a method of directly computing the positional difference of peaks of correlation computed through the intensity cross-correlation method of displacement estimated kernel, and while it does not require the phase unwrapping process, it also has a disadvantage that the observation precision is relatively lower than the InSAR. Accordingly, the present disclosure proposes an SAR phase unwrapping method based on offset tracking surface displacement model, to precisely observe the high-speed surface displacement. For the test described above, the ALOS-2 PALSAR-2 Stripmap interferometric pair acquired from the observation of the Kumamoto area in 2016 were processed according to the embodiment of the present disclosure, and from this, the enhancement of the surface displacement observation performance from that of the related SAR surface displacement observation method was confirmed.

This unwrapping error reduction technology is especially suitable for high resolution SAR image and may be applied to satellites such as ALOS-2 PALSAR-2, TerraSAR-X, COSMO-SkyMed, RADARSAT-2 and KOMPSAT-5, and may also be applied to the next generation radar satellites to be launched later such as TanDEM-L and NISAR. Therefore, the phase unwrapping method and apparatus for SAR interferogram based on SAR offset tracking surface displacement model proposed by the present disclosure may support the observation of surface displacement with high precision in various large-scale surface displacement situations occurring internationally, which has the potential to greatly increase utilization of SAR.

The phase unwrapping method for SAR interferogram based on SAR offset tracking surface displacement model according to an embodiment of the present disclosure may be implemented in the form of program instructions that may be executed by various computer means and may be recorded on a computer readable medium. The computer readable medium may include program instructions, data files, data structures, and the like alone or in combination. The program instructions recorded on the medium may be those specially designed and configured for the purposes of the present disclosure, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the present disclosure, and vice versa.

As described above, the present disclosure has been described with reference to specific items such as detailed components and the like and to limited embodiments and drawings, but these are provided only to help a more general understanding of the present disclosure, and the present disclosure is not limited to the specific embodiments described above, and various modifications can be made by those skilled in the art without departing from the gist of the present disclosure claimed in the claims, and such modifications should not be individually understood from the technical spirit or the prospect of the present disclosure.

Therefore, the spirit of the present disclosure should not be limited to the described embodiments, and all of the claims to be described below and equivalents thereof will fall within the scope of the present disclosure.

What is claimed is:

1. An apparatus comprising:
  circuitry configured to:
    acquire two Synthetic Aperture Radar (SAR) images of a same object acquired at different times;
    produce two single look complex (SLC) images corresponding to each of the two SAR images;
    generate an SAR interferogram using SAR interferometry for the two SLC images;
    produce an offset tracking surface displacement model using SAR offset tracking method for the two SLC images;
    generate a residual interferogram by subtracting the SAR interferogram and the offset tracking surface displacement model, and generate an unwrapped residual interferogram by unwrapping the generated residual interferogram;
    generate an unwrapped SAR interferogram by adding the unwrapped residual interferogram to the offset tracking surface displacement model;
    produce an SAR offset tracking surface displacement image using the offset tracking method for the two SLC images;
    correct a terrain effect on the SAR offset tracking surface displacement image by utilizing a linear model; and
    reduce a noise component present in the offset tracking surface displacement image to produce an SAR offset tracking surface displacement model;
    wherein the SAR offset tracking surface displacement image is produced by computing two-dimensional (2D) surface displacements in azimuth and range directions using a multiple-displacement estimated kernel based on the two SLC images, averaging the 2D surface displacements respectively, and estimating the 2D surface displacements in the final azimuth and range directions.

2. The apparatus according to claim 1, wherein the circuitry is further configured to produce the offset tracking surface displacement model by reducing noise components present in the offset tracking surface displacement image using non-local means filter.

3. The apparatus according to claim 2, wherein the circuitry is further configured to obtain an area having a difference value of subtracting a first image and a second image equal to or greater than a predetermined reference, wherein the first image is obtained by applying the non-local means filter to the offset tracking surface displacement image and the second image is obtained by applying the median filter to the offset tracking surface displacement image, and produces the offset tracking surface displacement model by masking out the obtained area from the first image and filling the masked-out area in consideration of value of a peripheral pixel.

4. The apparatus according to claim 1, wherein the circuitry is configured to generate the residual interferogram by wrapping and complex conjugating the offset tracking surface displacement model, and complexly multiplying by the SAR interferogram.

5. The apparatus according to claim 1, wherein the circuitry is further configured to generate an SAR interferometric surface displacement image by converting the unwrapped SAR interferogram expressed in phase in accordance with wavelength of the SAR image.

6. A method comprising:
acquiring two Synthetic Aperture Radar (SAR) images of a same object acquired at different times;
producing two single look complex (SLC) images corresponding to each of the two SAR images;
generating an SAR interferogram using SAR interferometry for the two SLC images;
producing an offset tracking surface displacement model using SAR offset tracking method for the two SLC images, wherein the producing an offset tracking surface displacement model includes:
producing an SAR offset tracking surface displacement image using the offset tracking method for the two SLC images;
correcting a terrain effect on the SAR offset tracking surface displacement image by utilizing a linear model; and
reducing a noise component present in the offset tracking surface displacement image to produce an SAR offset tracking surface displacement model,
generating a residual interferogram by subtracting the SAR interferogram and the offset tracking surface displacement model, and generating an unwrapped residual interferogram by unwrapping the generated residual interferogram;
generating an unwrapped SAR interferogram by adding the unwrapped residual interferogram to the offset tracking surface displacement model; and
producing the SAR offset tracking surface displacement image by computing two-dimensional (2D) surface displacements in azimuth and range directions using a multiple-displacement estimated kernel based on the two SLC images, averaging the 2D surface displacements respectively, and estimating the 2D surface displacements in the final azimuth and range directions.

7. The method according to claim 6, including:
producing the offset tracking surface displacement model by reducing noise components present in the offset tracking surface displacement image using non-local means filter.

8. The method according to claim 7, including:
obtaining an area having a difference value of subtracting a first image and a second image equal to or greater than a predetermined reference, wherein the first image is obtained by applying the non-local means filter to the offset tracking surface displacement image and the second image is obtained by applying the median filter to the offset tracking surface displacement image, and producing the offset tracking surface displacement model by masking out the obtained area from the first image and filling the masked-out area in consideration of value of a peripheral pixel.

9. The method according to claim 6, including:
generating the residual interferogram by wrapping and complex conjugating the offset tracking surface displacement model, and complexly multiplying by the SAR interferogram.

10. The method according to claim 6, further including:
generating an SAR interferometric surface displacement image by converting the unwrapped SAR interferogram expressed in phase in accordance with wavelength of the SAR image.

* * * * *